United States Patent
Smith et al.

(10) Patent No.: US 6,408,441 B1
(45) Date of Patent: Jun. 25, 2002

(54) PROTECTIVE ANIMAL SKINNING GLOVE

(75) Inventors: Curtis R. Smith, Wellesley; James Lattari, Attleboro, both of MA (US); Troy Hughes, Americus, GA (US)

(73) Assignee: Whiting & Davis, Attleboro Falls, MA (US)

(*) Notice: Subject to any disclaimer, the term of this patent is extended or adjusted under 35 U.S.C. 154(b) by 0 days.

(21) Appl. No.: 09/562,527

(22) Filed: May 2, 2000

(51) Int. Cl.[7] ............................................. A41D 19/00
(52) U.S. Cl. ............................................. 2/161.6; 2/163
(58) Field of Search ........................... 2/158, 159, 160, 2/161.6, 163, 167, 169; 43/4

(56) References Cited

U.S. PATENT DOCUMENTS

| | | | |
|---|---|---|---|
| 183,375 A | * | 10/1876 | Cutliff ............................ 2/159 |
| 218,322 A | | 8/1879 | Schilling |
| 436,206 A | * | 9/1890 | Bertheau et al. ............. 2/161.6 |
| 470,170 A | | 3/1892 | Alderman |
| 629,901 A | | 8/1899 | Freenstreet |
| 676,210 A | | 6/1901 | Torley |
| 750,903 A | | 2/1904 | Shrum et al. |
| 752,769 A | | 2/1904 | Graichen |
| 1,010,199 A | | 11/1911 | Stedman |
| 1,106,708 A | | 8/1914 | Hazard |
| 1,250,150 A | | 12/1917 | DuBois |
| 1,270,697 A | | 6/1918 | Chapman |
| 1,371,841 A | | 3/1921 | Berkwits |
| 1,445,094 A | | 2/1923 | Lindfeldt |
| 1,498,489 A | | 6/1924 | Steinmetz |
| 1,612,757 A | | 1/1927 | Wells |
| 1,736,928 A | * | 11/1929 | Lowe .......................... 2/161.6 |
| 2,067,424 A | | 1/1937 | Steinberger |
| 2,344,080 A | | 3/1944 | Burgett |
| 2,452,286 A | | 10/1948 | Benjamin |
| 2,501,571 A | * | 3/1950 | Liedtke ....................... 2/161.6 |
| 2,521,144 A | | 9/1950 | Bergh |
| 2,540,234 A | | 2/1951 | Berger et al. |
| 2,831,196 A | | 4/1958 | Scheiber |
| 2,862,208 A | | 12/1958 | Castro |
| 2,864,091 A | | 12/1958 | Schneider |
| 2,895,139 A | * | 7/1959 | Compton .................... 2/161.6 |
| 3,296,628 A | | 1/1967 | Collins |
| 3,577,836 A | | 5/1971 | Tamura |
| 3,872,514 A | * | 3/1975 | Liebelt .......................... 2/159 |
| 3,883,898 A | * | 5/1975 | Byrnes, Sr. ................... 2/167 |
| 3,885,383 A | | 5/1975 | Tanaka |
| 3,916,448 A | | 11/1975 | Hamel |
| 3,953,893 A | | 5/1976 | Byrnes, Sr. |
| 4,004,295 A | | 1/1977 | Byrnes, Sr. |
| 4,021,891 A | | 5/1977 | Morita |
| 4,149,296 A | * | 4/1979 | Stanford ....................... 17/66 |
| 4,200,852 A | | 4/1980 | Aoki |
| 4,229,496 A | | 10/1980 | Siegel |
| 4,388,733 A | | 6/1983 | Anstett |
| 4,438,532 A | | 3/1984 | Campanella et al. |
| 4,453,294 A | | 6/1984 | Morita |
| 4,471,495 A | | 9/1984 | Kruse et al. |

(List continued on next page.)

FOREIGN PATENT DOCUMENTS

| | | |
|---|---|---|
| CH | 664689 A5 | 3/1988 |
| DE | 3238499 C1 | 10/1982 |
| EP | 0 13 5398 | 3/1985 |
| GB | 12483 | 12/1909 |
| WO | PCT/EP95/04040 | 10/1994 |
| WO | PCT/EP95/01746 | 5/1995 |

Primary Examiner—John J. Calvert
Assistant Examiner—Katherine Moran
(74) Attorney, Agent, or Firm—Iandiorio & Teska

(57) ABSTRACT

A protective animal skinning glove having a gripping member protruding from at least one of the fingers of the glove for gripping the skin of an animal. The gripping member is positioned along the length of the finger to reduce strain on the flexor retinaculum while gripping the skin of the animal thereby reducing pressure on the carpal tunnel.

27 Claims, 7 Drawing Sheets

U.S. PATENT DOCUMENTS

| | | | |
|---|---|---|---|
| 4,493,865 A | 1/1985 | Kuhlmann et al. | |
| 4,507,353 A | 3/1985 | Kuhlmann et al. | |
| 4,515,851 A | 5/1985 | Johnson | |
| 4,525,877 A | 7/1985 | Chong | |
| 4,700,436 A | 10/1987 | Morita | |
| 4,709,694 A | 12/1987 | O'Connell | |
| 4,723,406 A | 2/1988 | Ripley | |
| 4,750,218 A | 6/1988 | Ziegler | |
| 4,802,242 A | 2/1989 | Lars-Jos | |
| 4,841,577 A | 6/1989 | Lars-Jos | |
| 4,843,650 A | 7/1989 | Kangas et al. | |
| 4,868,927 A | 9/1989 | Bourdeau et al. | |
| 5,023,953 A | 6/1991 | Bettcher | |
| 5,035,001 A | 7/1991 | Novick | |
| 5,054,126 A | 10/1991 | Rivkin | |
| 5,070,540 A | 12/1991 | Bettcher et al. | |
| 5,073,441 A | 12/1991 | Melec et al. | |
| 5,088,123 A | 2/1992 | MacDonald | |
| 5,113,526 A | 5/1992 | Wang et al. | |
| 5,142,746 A | 9/1992 | Morita | |
| 5,146,628 A | 9/1992 | Hermann et al. | |
| 5,201,075 A | 4/1993 | Svetich | |
| D348,141 S | 6/1994 | Lars-Jos, Jr. et al. | |
| 5,323,490 A | 6/1994 | Yarbrough | |
| 5,497,510 A * | 3/1996 | Knowles et al. | 2/21 |
| 5,511,241 A | 4/1996 | Ziegler | |
| 5,644,797 A | 7/1997 | Daneshvar | |
| 5,659,899 A | 8/1997 | Soter et al. | |
| 5,704,066 A | 1/1998 | Yamamoto | |
| 5,729,831 A | 3/1998 | Kuhlmann | |
| 5,771,488 A | 6/1998 | Honkala | |
| 5,862,521 A | 1/1999 | van Marwijk et al. | |
| 5,894,602 A * | 4/1999 | Smith et al. | 2/159 |

* cited by examiner

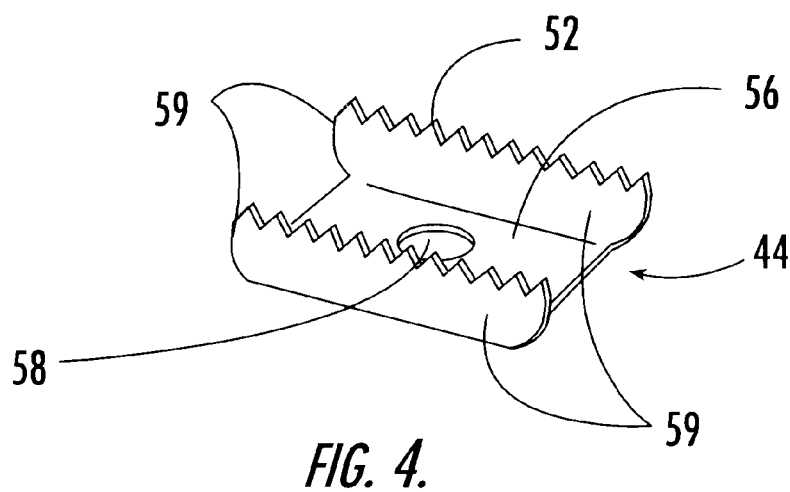
FIG. 4.
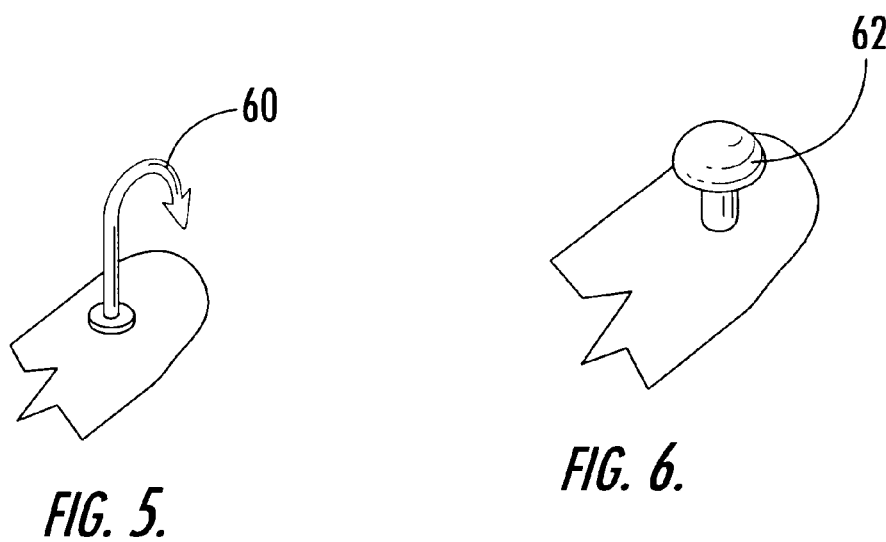
FIG. 5.
FIG. 6.
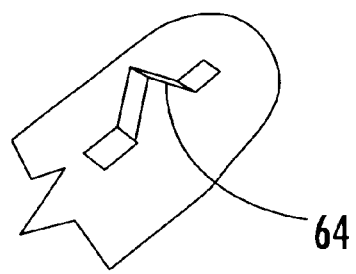
FIG. 7.

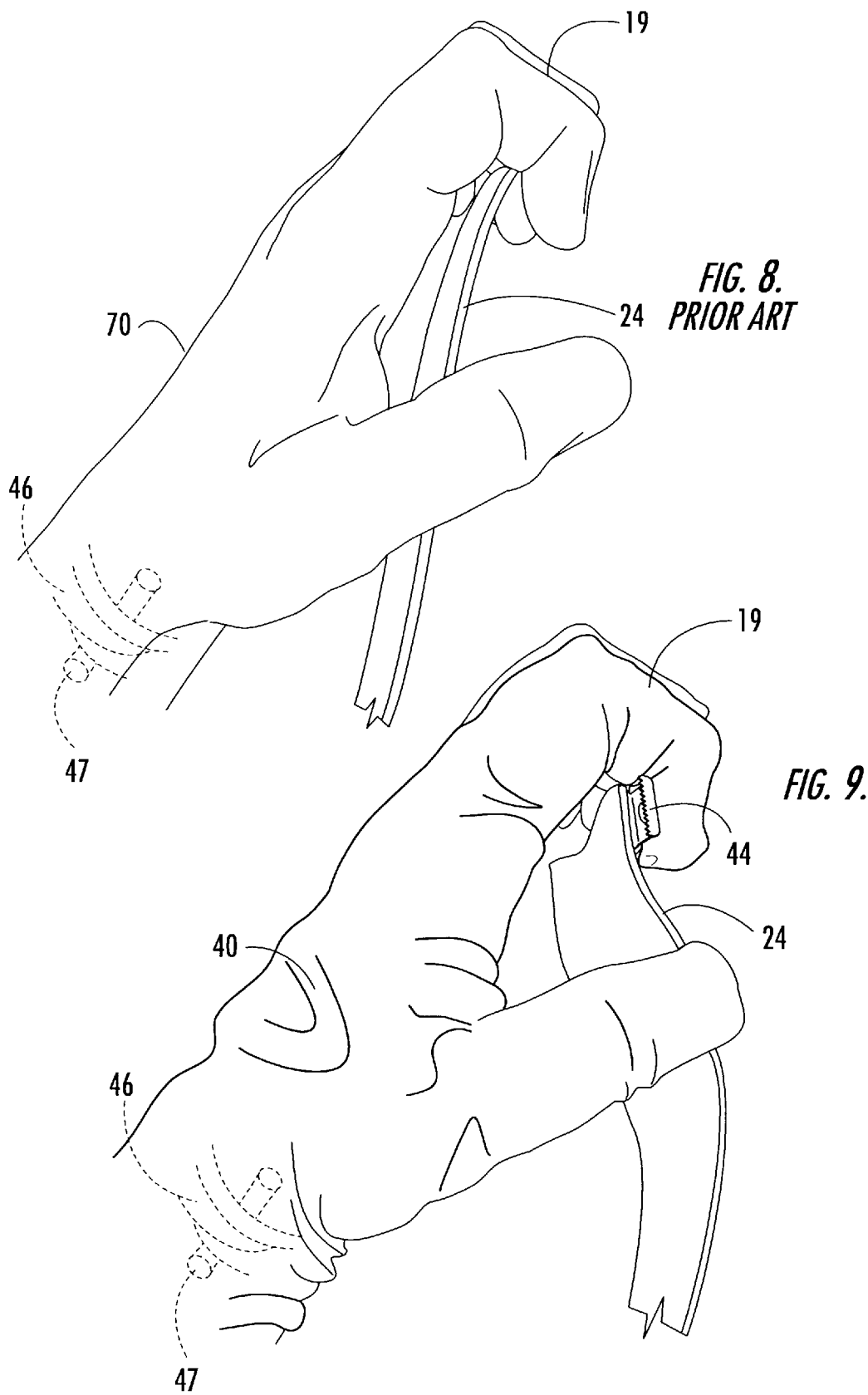

US 6,408,441 B1

PROTECTIVE ANIMAL SKINNING GLOVE

FIELD OF THE INVENTION

This invention relates to protective gloves and more particularly to a protective glove adapted for use in skinning animals such as chickens.

BACKGROUND OF INVENTION

In the poultry industry, birds are slaughtered and thereafter eviscerated. Ideally, to increase market value of the meat, the skin is carefully removed from the breast meat. In the process of skinning chickens, the hollow cavity of the bird is placed on a cone, which hangs on a rack of the moving production line. A cut then is made on the front of the bird near the top area under the wing to the bottom thigh area. A worker then reaches around from the back of the bird with two hands, inserts his fingers into the slit made by the cut, and pulls off the skin. To remove the skin, the worker must grip it very aggressively with a tight grip. This tight grip results in muscle strain from the finger muscles to the worker's wrist area, and in particular the flexor retinaculum muscle. Increased tension on the flexor retinaculum compresses the carpal tunnel, the passage between the flexor retinaculum of the hand and the carpal bones, resulting in compression of median nerve within the carpal tunnel. After continued, repetitive skinning operations, carpal tunnel syndrome may result.

When the skinning operations are performed with bare hands, there is a risk of contaminating the product, cuts to the hands, and transmission of diseases to the worker. To overcome these risks, workers often wear protective gloves, such as cotton, latex, nitrile or metal mesh gloves. However, with continued skinning operations, these protective gloves become saturated or covered with fat, blood, tissue matter, and the like. As the glove becomes saturated, it becomes even more slippery. As a consequence, the worker must grip the skin even harder to remove it from the bird. The result is that there is even more strain on the muscles in the wrist area.

SUMMARY OF THE INVENTION

It is therefore an object of this invention to provide a protective glove for skinning animals.

It is a further object of this invention to provide such a protective glove which provides for a more efficient grip on the skin of an animal during skinning operations.

It is a further object of this invention to provide such a protective glove which allows for a more relaxed grip.

It is a further object of this invention to provide such a protective glove which reduces wrist strain.

It is a further object of this invention to provide such a protective glove which reduces strain on the flexor retinaculum.

It is a further object of this invention to provide such a protective glove which transfers muscle strain during skinning operations to the triceps, biceps and shoulder muscles.

It is a further object of this invention to provide such a protective glove which reduces slippage of the glove even after repetitive skinning operations.

It is a further object of this invention to provide such a glove which protects the users hands while skinning an animal.

This invention results from the realization that the aggressive tight grip required to achieve a firm hold on the skin of an animal to be skinned, the resulting strain on the muscles of the wrist and pressure on the carpal tunnel created by such a tight grip, and the tendency of the glove to become slippery after repetitive skinning operations associated with prior art protective gloves can be eliminated by adding teeth protruding from the fingers of the glove which efficiently grip the skin of the animal thus allowing a more relaxed grip during repetitive skinning operations and thereby reducing strain on the muscles of wrist area.

This invention features a protective animal skinning glove comprising a gripping member protruding from at least one of the fingers of the glove for gripping the skin of the animal. The gripping member is positioned along the length of the finger to reduce strain on the flexor retinaculum while gripping the skin of the animal thereby reducing pressure on the carpal tunnel.

In the preferred embodiment, the glove is made of metal mesh material. The gripping member may include a plurality of sets of teeth. Each set of teeth preferably is serrated. Each set of teeth may project from a member secured to the metal mesh finger by a fastener extending through the metal mesh material, each member including opposing walls having the serrations thereon. The gripping member may also be a metal hook, a single serration, or a protruding dimple. The glove is typically made of textile, latex, nitrile, metal mesh, or various combinations of textile, latex, nitrile, and metal mesh.

The index finger may include two gripping members both located on the middle joint of the index finger. One of the gripping members is on the side of the index finger and the other is positioned on the bottom of the index finger. The thumb may have a gripping member positioned on the bottom proximate the top joint thereof.

BRIEF DESCRIPTION OF THE DRAWINGS

Other objects, features and advantages will occur to those skilled in the art from the following description of a preferred embodiment and the accompanying drawings, in which:

FIG. 4 is a schematic view showing a typical gripping member for a protective glove in accordance with the subject invention;

FIGS. 5–7 are schematic views depicting various alternative configurations of various gripping members in accordance with the subject invention;

FIG. 8 is a schematic view of the tight grip required to remove the skin from an animal according to prior art practices resulting in carpal tunnel syndrome; and FIG. 9 is a schematic view of the more relaxed grip possible if the protective glove of the subject invention is used reducing or eliminating carpal tunnel syndrome;

DISCLOSURE OF THE PREFERRED EMBODIMENT

Figure 1:
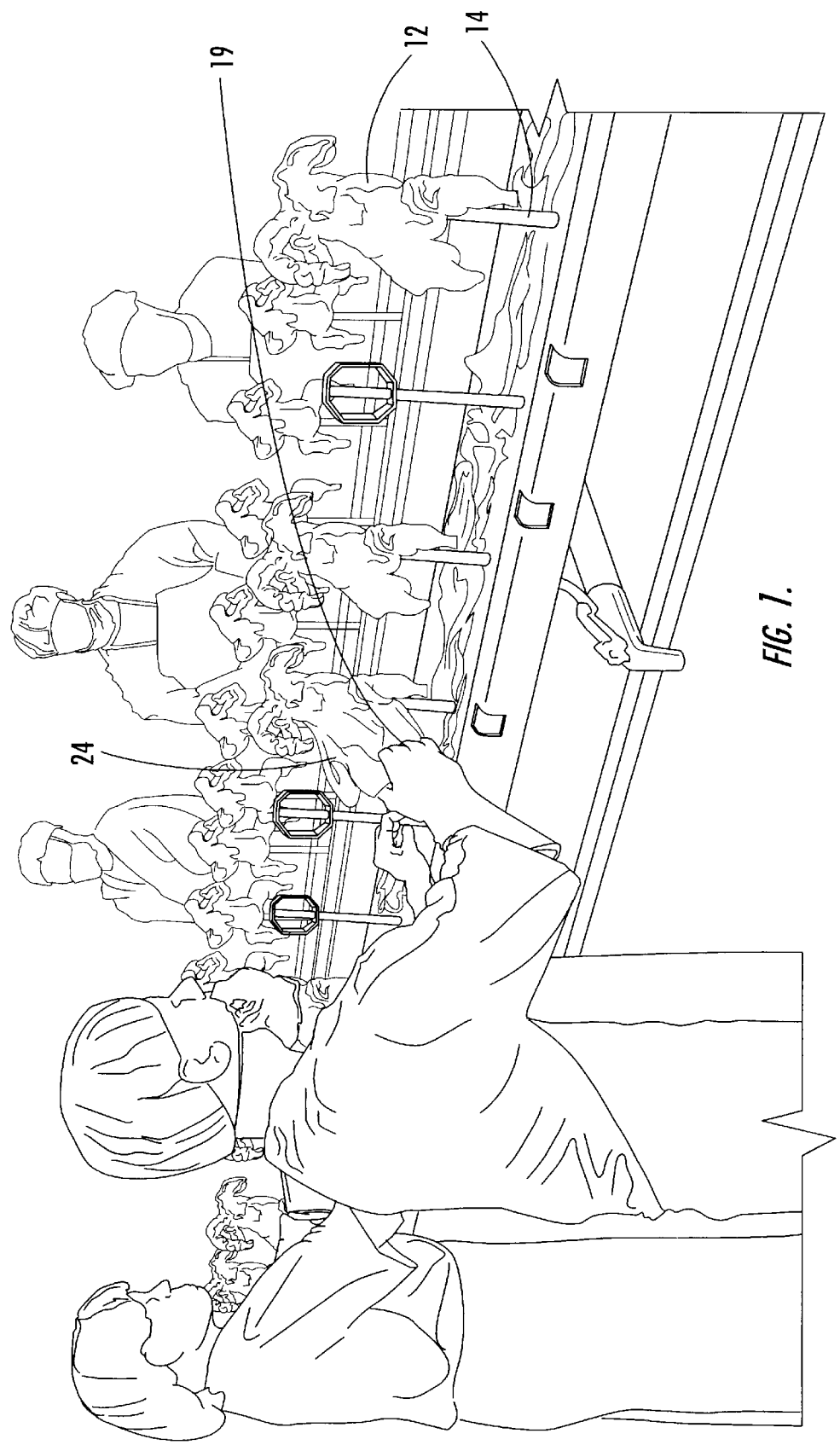
FIG. 1 is a schematic view of a chicken during a typical skinning operation.

As explained in the "Background of the Invention" section supra, typical animal skinning methods include placing eviscerated bird 12, FIG. 1 on cone 14. A cut is made from the top section of bird 12 to the bottom section thereof. Workers then insert the fingers 19 of both hands into the open flap created from the cut and pull skin 24 from bird 12. Workers rarely use their bare hands to perform this task due to the discomfort, the risks of contamination of the meat, cuts and abrasions to the workers hands, and transmission of diseases to the workers. Thus, workers generally resort to protective gloves made of cotton, latex, nitrile or metal mesh. However, with repetitive use, the gloves become covered or saturated with the waste products of skinning, causing the protective gloves to become very slippery, forcing the worker to grip even harder. This increases the strain on the muscles of the wrist area, including the flexor retinaculum, which in turns applies pressure to the carpal tunnel which then compresses median nerve. With repetitive operations, carpal tunnel syndrome may result. This syndrome is characterized by discomfort, disturbances of sensation in the hand, and reduction in flexion of the wrist.

Figure 2:
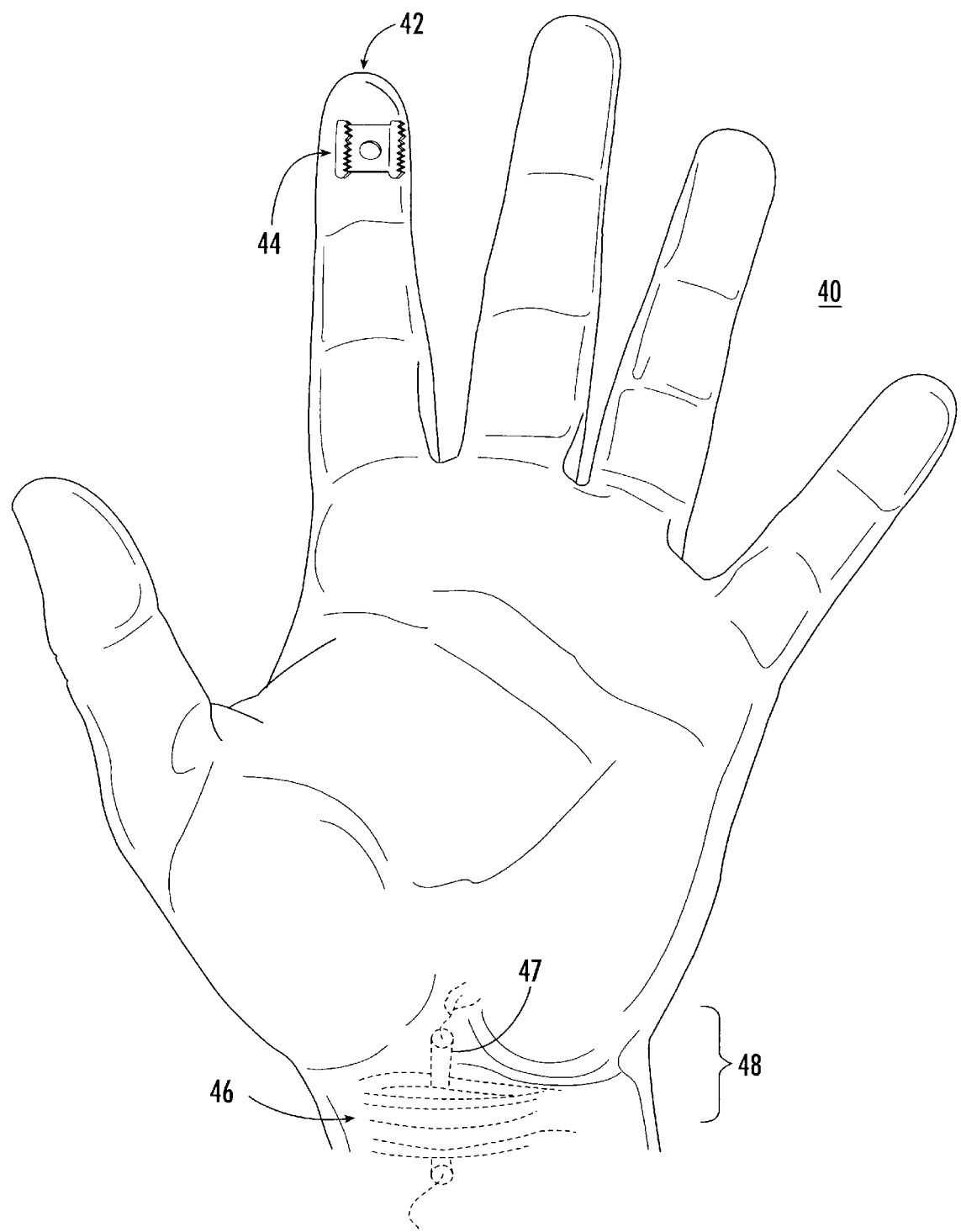
FIG. 2 is a schematic view of the protective glove of the subject invention with the palm up.
Figure 3:
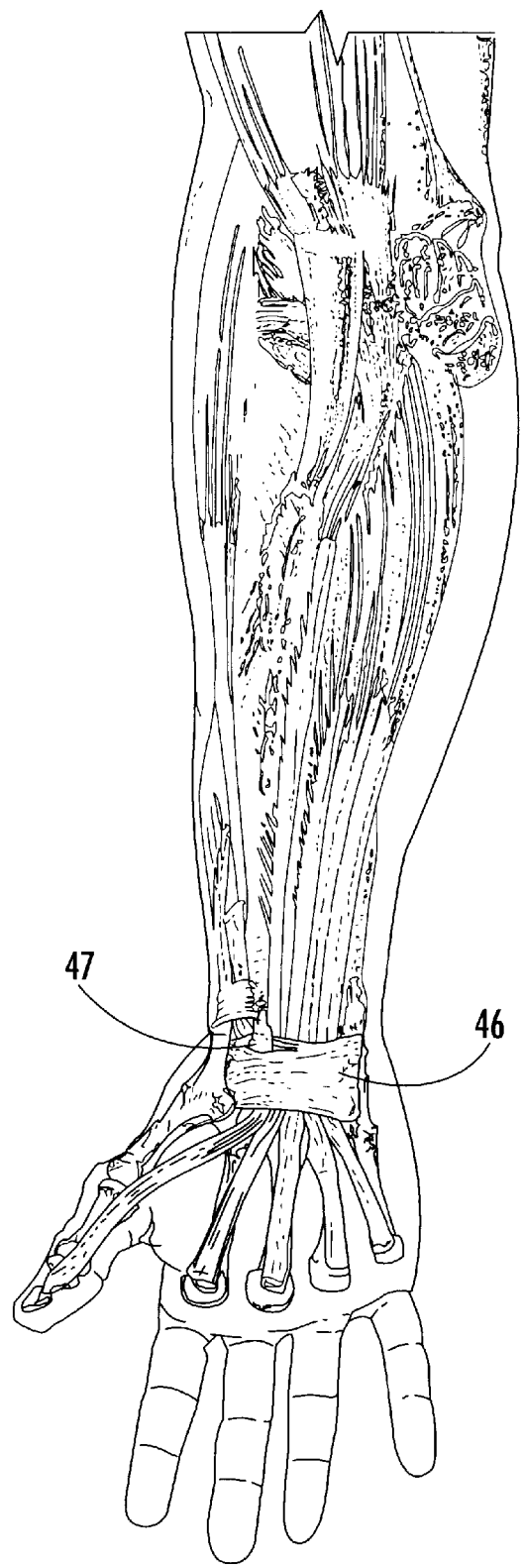
FIG. 3 is a detailed view of the muscles of the wrist.
Figure 10:
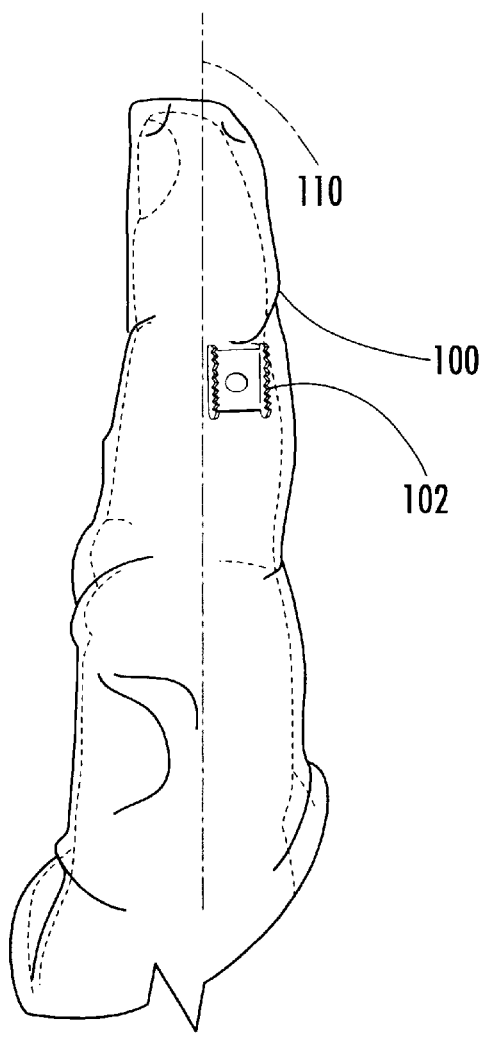
FIG. 10 is a schematic side view of the index finger of the glove of this invention showing two gripping members.

Protective animal skinning glove 40, FIG. 2 of the subject invention includes at least one finger 42 with gripping member 44 protruding therefrom as shown for gripping the skin of the animal. Gripping member 44 is typically positioned along the length of finger 42 to reduce strain on flexor retinaculum 46 of wrist area 48 as the wearer grips the skin of an animal thereby reducing pressure on carpal tunnel 47. Flexor retinaculum 46 and carpal tunnel 47 are shown in greater detail in FIG. 3.

In one preferred embodiment, protective animal skinning glove 40 is made of metal mesh material (e.g., stainless steel or titanium), however, glove 40 may also be made of cotton, latex, or nitrile. Glove 40 has at least one finger, but typically four fingers and a thumb. Gripping member 44, FIG. 4 typically include two sets or rows of teeth 52, each set protruding from finger 42. Curved base plate 56 is secured to metal mesh finger 42, FIG. 2 by fastener 58, typically a rivet. Opposing walls 59 are upstanding from base plate 56 and the tops of these walls define a number of teeth. Protective animal skinning glove 40, FIG. 2 typically includes at least one gripping member per finger. Other types of gripping members include hooks 60, FIG. 5, dimples 62, FIG. 6, and a single serrated tooth 64, FIG. 7.

The use of prior art protective glove 70, or the worker's bare hands, FIG. 8, required workers to tightly grip fingers 19 around animal skin fold 24 in order to adequately grip skin 12 to remove it from the animal. This aggressive grip transfers the strain from the muscles of fingers 19 to the muscles in the wrist area, particularly flexor retinaculum 46, which in turn applied pressure to carpal tunnel 47 and the median nerve within the tunnel. With repetitive skinning operations, carpal tunnel syndrome may result. Moreover, prior art gloves became saturated with waste products after multiple skinning operations causing protective glove 70 to become even more slippery, forcing worker to grip even more tightly, further compounding the problems associated with wrist strain.

In sharp contrast, protective skinning glove 40, FIG. 2 of the subject invention with protruding gripping member 44 provide sufficient gripping strength on skin 24 to allow fingers 19 to remain in a more relaxed position than prior art gloves while performing skinning operations. The relaxed position of fingers 19, as shown in FIG. 9, transfers muscle strain not the wrist area, and particularly the flexor retinaculum, but to the triceps, biceps, and shoulder muscles. This transfer of muscle strain results in a drastic reduction in strain on the flexor retinaculum, and pressure on the carpal tunnel and medial nerve which significantly reducing the possibility of carpal tunnel syndrome. Further, the efficient gripping power of protruding member 44 on skin 24 is minimally affected by the build up of waste material on skin 24.

Typically, the gripping member is attached to the fingers of the glove proximate the tip of the finger a shown in FIG. 2, but may vary in location depending on the use of the glove. There may be one gripping member per finger and one gripping member on the thumb or only one gripping member on one finger depending on the specific application. There may also be multiple gripping members on each finger, many fingers, or all fingers.

Figure 11:
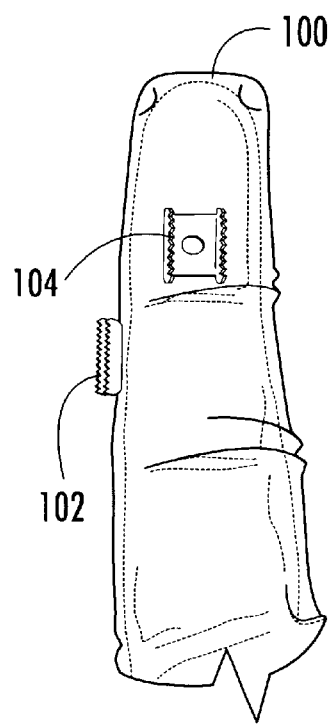
FIG. 11 is a schematic view of the bottom of the glove index finger shown in FIG. 10.
Figure 12:
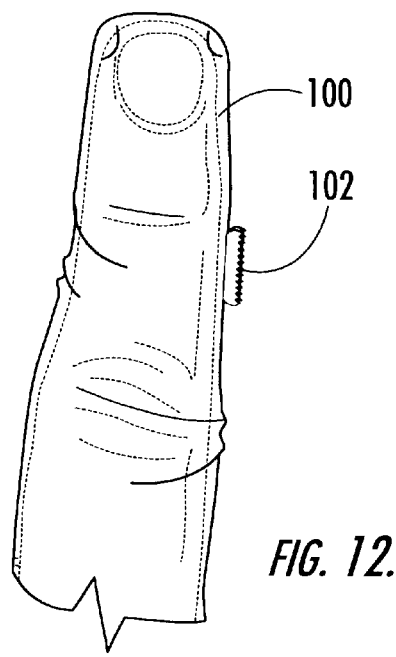
FIG. 12 is a schematic view of the top of the glove index finger shown in FIG. 10.
Figure 13:
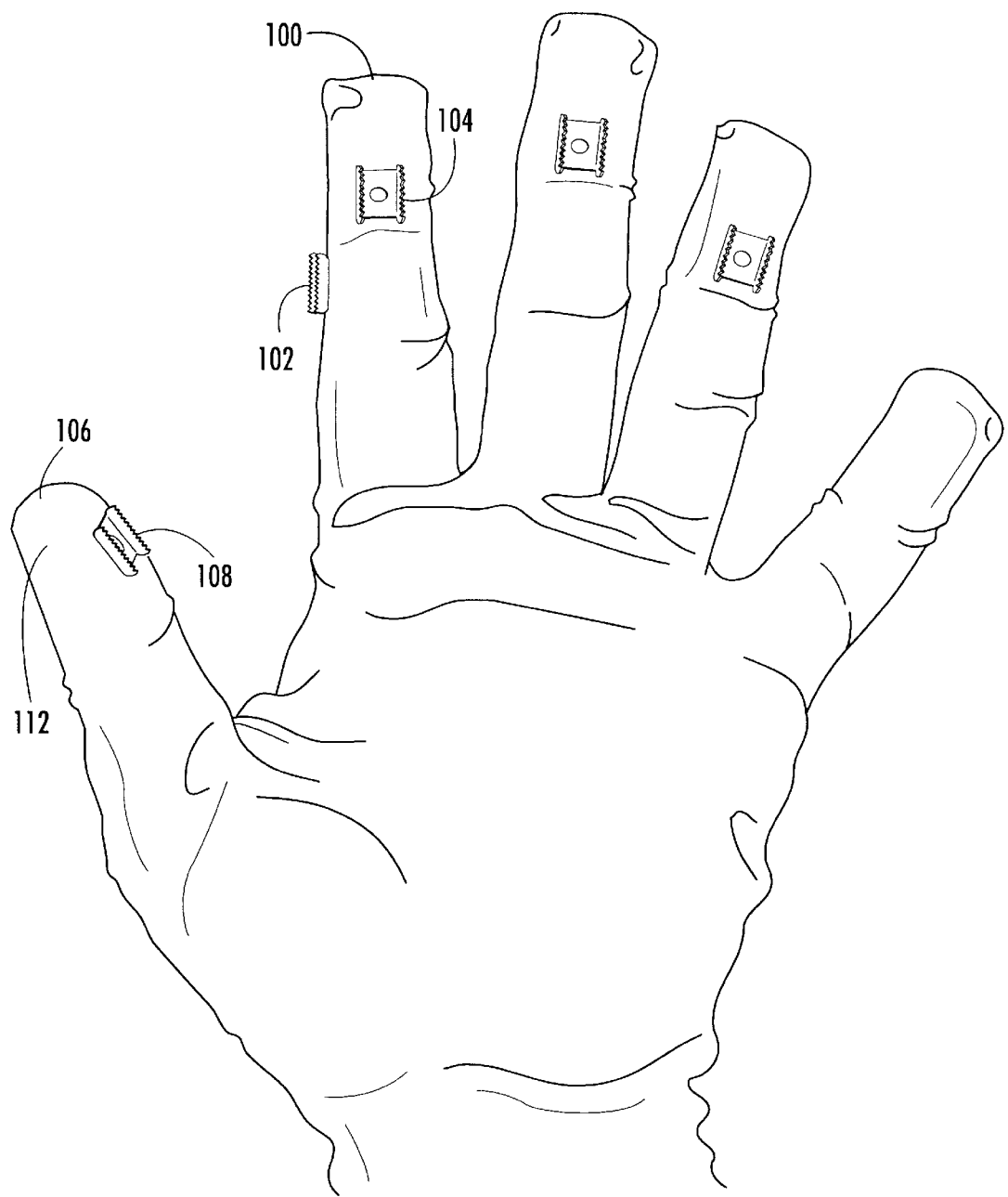
FIG. 13 is a schematic view of the bottom of one preferred embodiment of the glove of the subject invention wherein the thumb has one gripping member and the index finger has two gripping members as also shown in FIGS. 10–12.

As shown in FIGS. 10–13, the index finger 100 of the glove of this invention preferably has two gripping members 102 and 104 thereon and thumb 106 has one gripping member 108 positional on the bottom of top joint 112 which cooperates with one or both of index finger 100 gripping members 102 and 104. Thus, when index finger 100 is viewed from the thumb side (FIG. 10), gripping member 102 is located just to the right of the centerline 110 of index finger 100 slightly lower than gripping member 104. Gripping member 104, FIG. 11 is located at the bottom of the top joint of the index finger in the center thereof.

In this way, when the worker grasps animal skin between his thumb 106 and index finger 100, gripping member 108 will cooperate with one or both of gripping members 102 and 104 providing a firm grip on the animal's skin.

In some embodiments, the glove may only have five fingers and a thumb with no palm section to reduce weight. In other embodiments, the thumb and the fingers of the glove may be made of metal mesh material and the remainder of the glove made of cotton or other textile based materials, latex, nitrile, or other fabrics, or other rubber or plastic compositions. The whole glove could be made entirely of textile (e.g. cotton), entirely of latex or nitrile, or entirely of rubber or plastic compositions. Metal mesh is preferred however over cotton which sheds fibers and latex or nitrile which are very slippery.

Although specific features of the invention are shown in some drawings and not in others, this is for convenience only as each feature may be combined with any or all of the other features in accordance with the invention.

Other embodiments will occur to those skilled in the art and are within the following claims:

What is claimed is:

1. A protective animal skinning glove comprising:
    at least one index finger made of metal mesh material; and
    at least two gripping members protruding from the index finger for gripping the skin of the animal to reduce strain on the flexor retinaculum thereby.

2. The protective animal skinning glove of claim 1 in which the gripping member includes a plurality of sets of teeth.

3. The protective animal skinning glove of claim 2 in which each set of teeth is serrated.

4. The protective animal skinning glove of claim 3 in which each set of teeth project from a member secured to the metal mesh finger by a fastener extending through the metal mesh material, each member including opposing walls having serrations thereon.

5. The protective animal skinning glove of claim 1 in which the at least one gripping member is selected from the group consisting of metal hooks, serrations and protruding dimples.

6. The protective animal skinning glove of claim 1 further including a thumb having a gripping member positioned on a bottom portion of the thumb proximate a top joint thereof.

7. The protective animal skinning glove of claim 1 further including a thumb having a gripping member positioned on a bottom of a top joint thereof.

8. A protective animal skinning glove comprising:
at least one index finger made of metal mesh material; and
at least two gripping members protruding from the middle joint of the index finger for gripping the skin of the animal to reduce the strain on the flexor retinaculum thereby reducing pressure on the carpal tunnel.

9. The protective animal skinning glove of claim in which the gripping member includes a plurality of sets of teeth.

10. The protective animal skinning glove of claim 9 in which each set of teeth is serrated.

11. The protective animal skinning glove of claim 10 in which each set of teeth project from a member secured to the metal mesh finger by a fastener extending through the metal mesh material, each member including opposing walls having serrations thereon.

12. The protective animal skinning glove of claim 8 in which the at least one gripping member is selected from the group consisting of metal hooks, serrations and protruding dimples.

13. The protective animal skinning glove of claim 8 in which the glove is made of material selected from the group consisting of textile fabric, latex, nitrile, and metal mesh and combinations of textile fabric, latex, nitrile, and metal mesh.

14. The protective animal skinning glove of claim 8 further including a thumb having a gripping member positioned on a bottom portion of the thumb proximate the top of the joint thereof.

15. The protective animal skinning glove of claim 8 further including a thumb having a gripping member positioned on a bottom of a top joint thereof.

16. A protective animal skinning glove comprising:
metal mesh material having four fingers and a thumb; and
at least one gripping member protruding from at least one finger for gripping the skin of the animal, the gripping member positioned along the length of the at least one finger to reduce strain on the flexor retinaculum thereby reducing pressure on the carpal tunnel.

17. The protective animal skinning glove of claim 16 which the gripping member includes a plurality of sets of teeth.

18. The protective animal skinning glove of claim 17 in which each set of teeth is serrated.

19. The protective animal skinning glove of claim 18 in which each set of teeth projected from a member secured to the metal mesh finger by a fastener extending through the metal mesh material, the member including opposing walls having serrations thereon.

20. The protective animal skinning glove of claim 16 further including a gripping member protruding from the thumb of the glove.

21. A protective animal skinning glove comprising:
at least one finger made of metal mesh material; and
at least one gripping member protruding from the at least one finger for gripping the skin of the animal, the gripping member positioned along the length of the finger to reduce strain on the flexor retinaculum thereby reducing pressure on the carpal tunnel.

22. A protective animal skinning glove comprising:
at least one finger made of metal mesh material; and
at least one gripping member protruding from the at least one finger for gripping the skin of the animal, the gripping member positioned along the length of the finger to reduce strain on the flexor retinaculum thereby reducing pressure on the carpal tunnel,
the finger having a longitudinal axis, the gripping member having opposing rows of teeth each row extending in the direction of the longitudinal axis of the finger.

23. A protective animal skinning glove comprising:
at least an index finger and a thumb both made solely of metal mesh material;
at least one discrete gripping member fixed to the metal mesh material of the index finger including a plurality of teeth protruding from the index finger and configured to grip the skin of an animal in a way which reduces strain on the floor retinaculum thereby reducing pressure on the carpal tunnel.

24. The protective animal skinning glove of claim 23 in which there are two discrete gripping members protruding from the index finger.

25. The protective animal skinning glove of claim 24 in which one said gripping member is positioned on a side of the index finger, the other said gripping member is positioned on a bottom portion of the index finger.

26. The protective animal skinning glove of claim 23 in which there is a discrete gripping member on the thumb.

27. The protective animal skinning glove of claim 21 in which the discrete gripping member positioned on the thumb is positioned on a bottom portion of the thumb proximate a top joint thereof.

* * * * *